US007266134B2

(12) United States Patent
Lin

(10) Patent No.: US 7,266,134 B2
(45) Date of Patent: Sep. 4, 2007

(54) TRANSMISSION CIRCUIT FOR A DIGITAL COMMUNICATION SYSTEM

(75) Inventor: Yen-Yu Lin, Taipei (TW)

(73) Assignee: Mediatek Inc., Hsin-Chu Hsien (TW)

( * ) Notice: Subject to any disclaimer, the term of this patent is extended or adjusted under 35 U.S.C. 154(b) by 858 days.

(21) Appl. No.: 10/604,243

(22) Filed: Jul. 3, 2003

(65) Prior Publication Data

US 2004/0106402 A1    Jun. 3, 2004

(30) Foreign Application Priority Data

Jul. 11, 2002    (TW) ............... 91115470 A

(51) Int. Cl.
*H04B 1/00* (2006.01)
(52) U.S. Cl. ............ 370/545; 370/391; 370/465; 455/88; 455/91
(58) Field of Classification Search ........... 455/424, 455/432.2, 88, 70, 91; 370/538, 476, 545, 370/391, 351
See application file for complete search history.

(56) References Cited

U.S. PATENT DOCUMENTS

| 5,850,389 | A  | * | 12/1998 | Wesler ............... 370/325 |
| 6,233,253 | B1 | * | 5/2001  | Settle et al. ......... 370/474 |
| 6,996,079 | B1 | * | 2/2006  | Bergenwall et al. .... 370/331 |
| 7,106,757 | B2 | * | 9/2006  | Hong et al. .......... 370/469 |
| 2002/0159457 | A1 | * | 10/2002 | Zhang et al. ........ 370/391 |

* cited by examiner

*Primary Examiner*—George Eng
*Assistant Examiner*—Brandon J. Miller
(74) *Attorney, Agent, or Firm*—Winston Hsu

(57) ABSTRACT

A transmission circuit for realizing a rate adaptation layer of a digital communication system. The transmission circuit includes a processor and a format conversion circuit. The processor is capable of managing transmission rates of input and output digital signals of the digital communication system. The format conversion circuit includes a plurality of input units and output units; each input unit is for receiving a bit according to the input digital signal, and each output unit is for transmitting a bit to form the output signal. Each input unit and output unit are connected by hardware wires to realize data formatting such as bit-reordering, command insertion.

6 Claims, 13 Drawing Sheets

TRANSMISSION CIRCUIT FOR A DIGITAL COMMUNICATION SYSTEM

BACKGROUND OF INVENTION

1. Field of the Invention

The present invention provides a transmission circuit to be used in a digital communication system, specifically a transmission circuit that utilizes a hardware circuit to expedite data format converting in a rate adaptation layer of the digital communication system.

2. Description of the Prior Art

Digital communication systems have been established as one of the most important infrastructures of modern information society. As a result, improving signal processing capability of various digital circuits within the digital communication system has become a major focus for the contemporary IT industry.

Please refer to FIG. 1, which is a typical digital communication system 10 that illustrates the process flow for digital data transmission. Digital communication system 10 may be a GSM (global system for mobile communications) system that powers the cellular phone. Digital communication system 10 contains various layers of logical structures, making possible a complete range of digital communication functions. These logical structure layers includes a high level protocol 12, physical layer 14, rate adaptation layer 16 and follow-on wireless transmission network 18. The high level protocol 12 contains a cellular phone driver program, AT instruction interpreter, etc.

When a user sends out wireless data via the digital communication system 10, the high level protocol 12 reads data transmission addresses, formats, and relevant protocols, and processes the data according to the appropriate data type, followed by transmission to the physical layer 14. As illustrated in FIG. 1, there are three different types of data: transparent data 20A, fax data 20B and non-transparent data 20C. While transmitting signals, relevant transmission instruction 20D is also transmitted to the physical layer 14, where further processing on various types of data is undertaken to facilitate wireless data transmission to the wireless transmission network 18. However, different types of data are transmitted to the high level protocol 12 and the physical layer 14 at different transmission rates. Prior to transmitting data wirelessly, buffering and format converting of various types of data (with varying transmission speeds) is needed to unify the rate of data transmission to the wireless transmission network 18, and the rate adaptation layer 16 of digital communication system 10 aims to reconcile the different types of data with varying transmission rates, rendering a unified data transmission rate to the wireless transmission network 18. The rate adaptation layer 16 uses various format converting/data buffer models, ranging from 22A and 22B to 22C, to manage the transparent data 20A, fax data 20B and non-transparent data 20C. In the end, instruction 20D is added to various data formats by the format converting processor 24, forming a data flow with a unified transmission rate, and the data flow is transmitted by the wireless transmission network 18. For instance, within a GSM system the format converting/data buffer 22A includes RA0 converting functionRA0 and encoding; the format converting/data buffer 22B includes a T30 converting function and bit reversal; the format converting/data buffer 22C includes RLP+FCS converting; the format converting processor 24 includes a RA1 converting function. Take RA0 converting function for instance, transparent data 20A could transmit data to rate adaptation layer 16 at 300, 1200, 2400, 4800, 9600 and 14.4 k (14400) bits per second. Assume that a sequential data flow from D1, D2 . . . to D8 are transmitted to the rate adaptation layer 16 at the rate of 2400, 4800, 9600 and 14.4 k bits per second, which leads to RA0 converting function to sequentially output bits flow like St, D1, D2, D3, D4, D5, D8, D7, D8 and Sp, where St and Sp stand for special instructions. Assume the data are transmitted at a slow rate of 1200 bits per second to the rate adaptation layer 16, then the RA0 converting function would output bits flow like St, St, D1, D1, D2, D2, D3, D3, D4, D4, D5, D5, D6, D6, D7, D7, D8, D8, Sp, Sp. In other words, assume the data is transmitted to the rate adaptation layer 16 at a slower rate, then the rate adaptation layer 16 would repeat certain data to generate a higher rate of transmission data. Assume the data are transmitted to the rate adaptation layer 16 at an even slower rate of 300 bits per second, RA0 converting function would repeat more data.

Besides buffering data with different transmission speeds, rate adaptation layer 16 also needs to perform format converting on the inputted data, and then transmit the converted data out. Please refer to FIGS. 2A to 2D, which illustrates four different types of data format converting, where data A is to be converted data B, and A0, A1 to A7 represent different bit of data A, with A0 being the Most Significant Bit (MSB). Similarly, B0, B1, etc. represent different bit of data B, with B0 being the most significant bit (MSB). The basic data format converting at rate adaptation layer 16 includes four types, as illustrated in FIGS. 2A to 2D and as follows:

(1) Modify the bit sequence of the un-converted data (data A). For instance, as illustrated in FIG. 2A, B0 of the converted data B is A5 of data A, B1 is A3, and B7 is A4.

(2) Insert additional data or instruction bits into unconverted data (data A). As illustrated in FIG. 2B, two control bits, C0 and C1, are inserted and become B4 and B8 respectively of converted data B.

(3) Erase part of the unconverted data (data A). For instance, as illustrated in FIG. 2C, converted data B corresponds to data A from A1 to A6, with bit A0 and A7 erased.

(4) Insert a logical operation result of unconverted data (data A). As illustrated in FIG. 2D, besides bits from B0 to B7 corresponding to those from A0 to A7, bits in A could undergo logical operation OP, and the result of the logical operation is inserted in B. For instance, OP could be a parity check on data A, and the parity check value is inserted into data B. As illustrated in FIG. 2D, the result of OP becomes bit B8 in data B. Certainly, the result of OP could be inserted to any other location in data B.

With the prior art digital communication system, a micro-controller is used to realize data buffering and format converting functions in the rate adaptation layer. In data buffering, the micro-controller is capable of repeating data with slower transmission rate, or insert instruction or other bits to generate data with higher transmission rate. Assuming the data transmission rate into the rate adaptation layer is not constant (sometimes with higher transmission rate; sometimes with lower), the micro-controller is capable of temporarily storing certain input data, which renders a uniform transmission rate for output data from the rate adaptation layer. In data format converting capability, the micro-controller of the prior art technology performs the converting by executing a program comprising pre-determined sets of instructions. Generally speaking, instruction set residing in the micro-controller combines various functions, the likes of bit shift in the buffer and bit OP, so as to perform the operations it needs for data format converting. For instance, when the micro-controller undergoes data format converting as illustrated in FIG. 2A, converting bits in data A from [A7, A6, A5, A4, A3, A2, A1, A0] to [A4, A0, A7, A1, A6, A2, A3, A5] in data B, the following steps are performed:

Step 1: reset all bits in a destination buffer AR. For example, all bits in the destination buffer AR are reset to zero.

Step 2: copy data A onto another buffer BR.

Step 3: via AND operation on bits, mask out bits from A7 to A1 in BR, which combines [A7, A6, A5, A4, A3, A2, A1, A0] and [0, 0, 0, 0, 0, 0, 0, 1] (a mask data) into [0, 0, 0, 0, 0, 0, 0, A0].

Step 4: via bit shifting, transform [0, 0, 0, 0, 0, 0, 0, A0] into [0, A0, 0, 0, 0, 0, 0, 0].

Step 5: Execute OR operation on bits in both BR and AR, which renders [0, A0, 0, 0, 0, 0, 0, 0] in AR—thus completing the movement on a single bit.

As for other bits in data A, repeat the above steps from 1 to 4 (wherein step 3 uses different mask data, and in step 4 shift bit to different position), thus completing the data format converting in FIG. 2A. Other types of data format converting get accomplished in a similar fashion.

When undertaking data buffer processing and adjusting the data transmission rate, the micro-controller is called upon to handle various logical considerations and operations. However with the prior art technology, the micro-controller is also called upon to handle data format converting in accordance with an instruction set program. Since the micro-controller instruction set program is unable to directly depict data format converting, it calls for a cumbersome process to complete the data format converting. As mentioned earlier, a simple bit shift in the prior art technology requires going from step 1 to step 4. And within each step, there are additional details to go through (for instance, in step 4 micro-controller achieves only 1 bit shift per operation pulse cycle). So to use the prior art method in achieving data format converting would be too time consuming and taking up too many micro-controller resources. As data flow edges upward in todays digital communications, so do stringent requirements on the processing speed. The prior art method of using the instruction set program and the micro-controller for data format converting would definitely be hard pressed to cope with the high requirements for data processing efficiency of contemporary digital signal systems.

SUMMARY OF INVENTION

Consequently the objective of the claimed invention is to use a hardware electrical circuit to realize data format converting in the rate adaptation layer, and providing a solution to the prior art technology.

With the prior art technology, a micro-controller is called upon to handle data format converting in a rate adaptation layer in accordance with an instruction set program. Since the micro-controller instruction set program is unable to directly depict data format converting, thus it calls for cumbersome processes and instructions to complete the data format converting, which renders less than desirable efficacy in data format converting and taking up too much micro-controller resources. Meanwhile a huge memory space is needed to store the cumbersome program required for data format converting.

The claimed invention uses a format converting electrical circuit, which directly tackles the task of data format converting through circuit layout, without calling upon a micro-controller to handle data format converting, which on one hand frees up micro-controller resources and enhances the efficiency in data format converting and processing speed. On the other hand, this does away with the need to store the program required for data format converting, and saves memory space. However in the claimed invention, the data buffering function is for the micro-controller to realize.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 3:
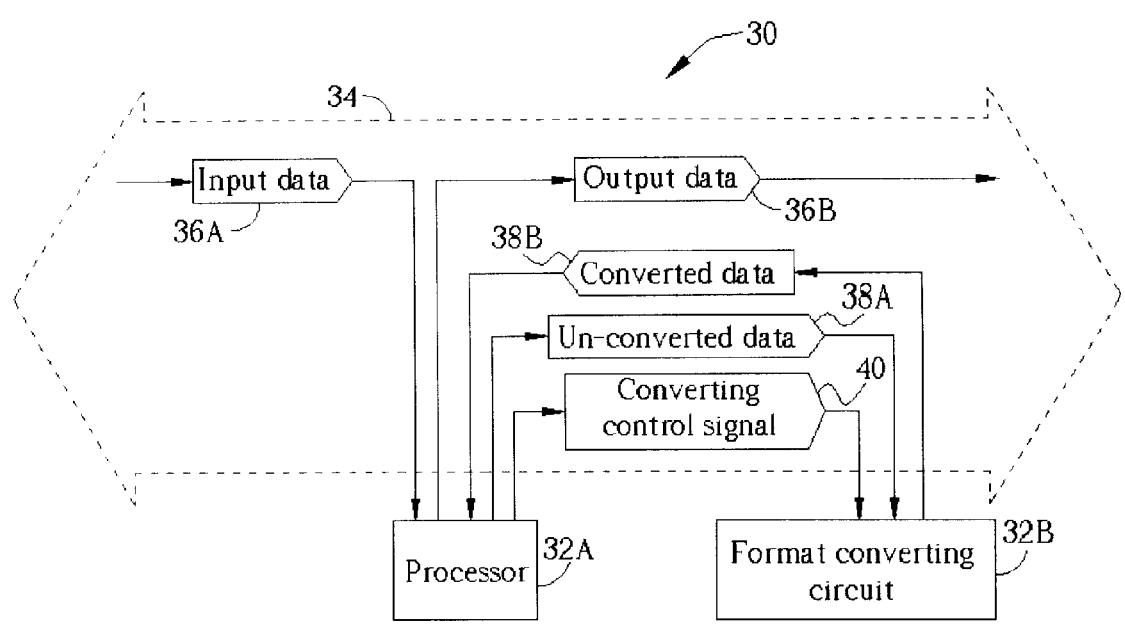
FIG. 3 illustrates a function box of the present invention, a transmission circuit.

Please refer to FIG. 3, which illustrates how a transmission circuit 30 realizes a function of a rate adaptation layer in a digital communication system. The transmission circuit 30 contains a processor 32A and a format converting circuit 32B which are connected through a data bus 34 (or other forms of circuitry that exchanges transmission signals). The processor 32A is capable of managing data buffering and adjusting the difference in transmission rate between input and output signals.

The format converting circuit 32B is capable of realizing data format converting through hardware circuitry. When input data 36A, as illustrated in FIG. 3, transmits to the rate adaptation layer via the bus 34, the processor 32A starts transforming input data 36A into unconverted data 38A and transmits it to the format converting circuit 32B, which is controlled by a converting control signal 40 to undergo necessary data format converting.

When the format converting circuit 32B completes its task, unconverted data 38A is transformed into converted data 38B, which is then transmitted back to the processor 32A. After the processor 32A is done with data buffering and transmission rate adjustment, it then generates a corresponding data 36B, to be outputted via the bus 34, thus completing the function of the rate adaptation layer.

Figure 4:
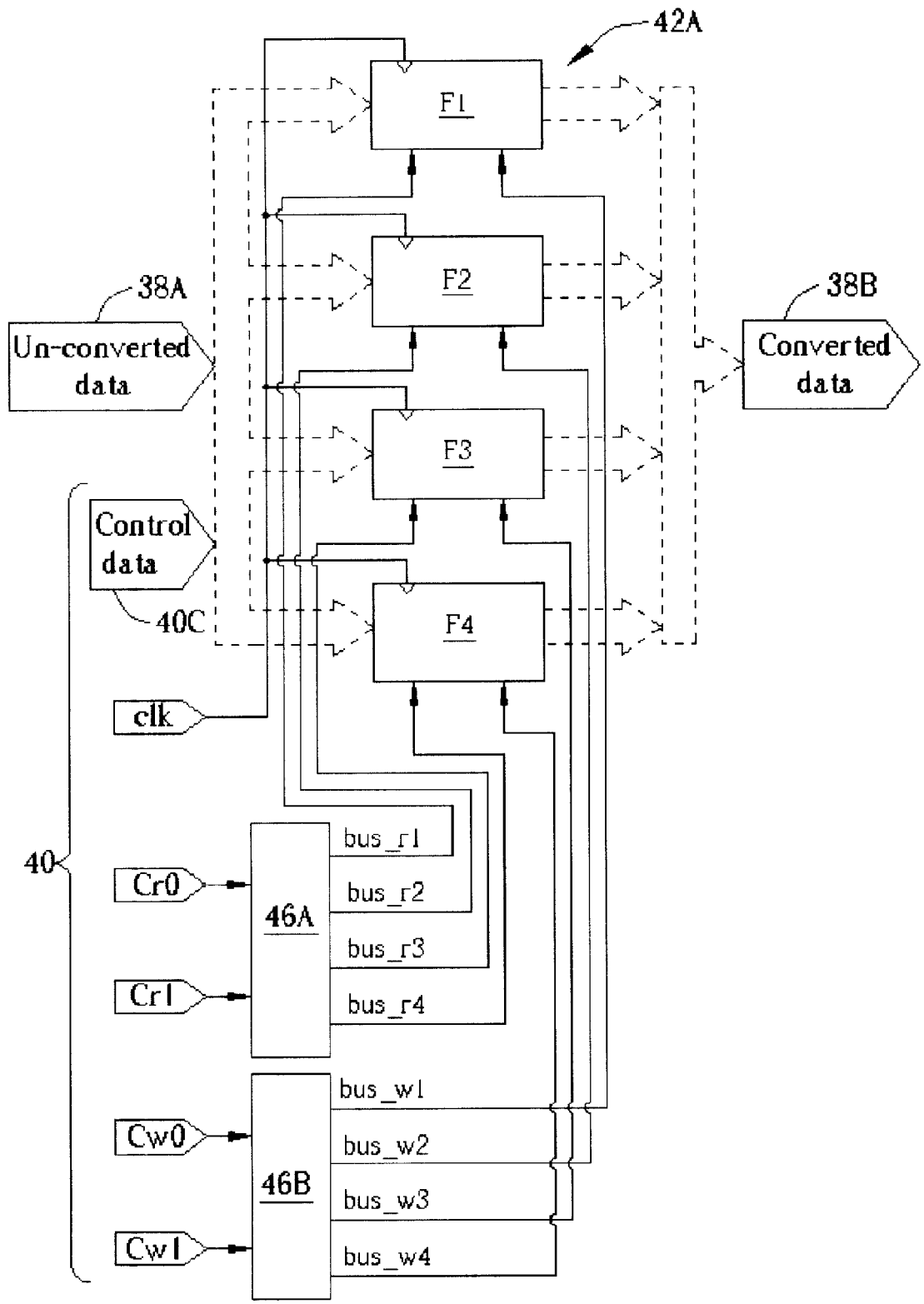
FIG. 4 illustrates an example of a format converting circuit in FIG. 3.

Format converting circuit 32B of the present invention is capable of being implemented in many different ways. Please refer to FIG. 4 (in conjunction with FIG. 3). FIG. 4 demonstrates how the format converting circuit 32B works, as illustrated in a format converting circuit 42A function box according to one embodiment. As mentioned earlier, there are four basic types of data format conversion at the rate adaptation layer, wherein format converting circuit 42A has four sub-format converting circuits, ranging from F1 to F4, which perform four different types of data format converting separately, along with two decoders, 46A and 46B.

As illustrated in FIG. 3, processor 32A transmits unconverted data 38A and converting control signal 40 to the format converting circuit 42A, and receives converted data 38B outputted by the format converting circuit 42A; wherein format converting circuit 42A transmits unconverted data 38A to sub-format converting circuits, ranging from F1 to F4, respectively. Converting control signal 40 includes a clock pulse clk, Cr0, Cr1, Cw0, Cw1, and other control data 40C. Clk coordinates data transmission. Cr0, Cr1, Cw0, Cw1 are used to select four different types of data format converting bits. Decoder 46A receives bits Cr0 and Cr1 and generates four activation signals, from bus_r1 to bus_r4. As illustrated in FIG. 4, each activation signal (bus_r1 to bus_r4) corresponds to one sub-format converting circuit and can set the corresponding sub-format converting circuit in motion, receive unconverted data 38A and execute a certain type of data format converting. Similarly, decoder 46A receives bits Cw0 and Cw1 and generates another four activation signals, from bus_w1 to bus_w4. Each activation signal (bus_w1 to bus_w4) corresponds to one sub-format converting circuit, and can make the corresponding sub-format converting circuit send the converted data back to the bus.

Every activation signal controls a sub-format converting circuit, which transmits the converted data (in this case 38B) to the bus 34. For instance, assume sub-format converting circuit F1 is used to convert a certain data format. Processor 32A then resets bit Cr0 and Cr1 to 0 and 0, which renders bus_r1 as "1" (High Standard) and others from bus_r2 to bus_r4 as "0" (Low Standard).

Signal bus_r1 in turn "activates" the corresponding sub-format converting circuit F1, which starts receiving unconverted data 38A for data format conversion. However for the other sub-format converting circuits, from F2 to F4, due to a "0" value in signals from bus_r2 to bus_r4, no data format converting is performed.

Meanwhile, processor 32A resets bits Cw0 and Cw1 as 0 and 0, which renders activation signal bus_w1 as "1" and thus control sub-format converting circuit F1 in transmitting converted data (38B) to the bus.

And each of the "0" value signals, ranging from bus_w2 to bus_w4, instructs its corresponding sub-format converting circuits, from F2 to F4, not to transmit data to the bus.

By changing the value in bits Cr0, Cr1 and Cw0, Cw1, a different sub-format converting circuit is chosen to handle different types of data format conversion.

As for sub-format converting circuit illustrations from F1 to F4 in FIG. 4, please refer to FIG. 5A to FIG. 5D, wherein F1 to F4 illustrates four types of data format conversion taking place from FIG. 2A to FIG. 2D, respectively in this embodiment.

Figure 5A:
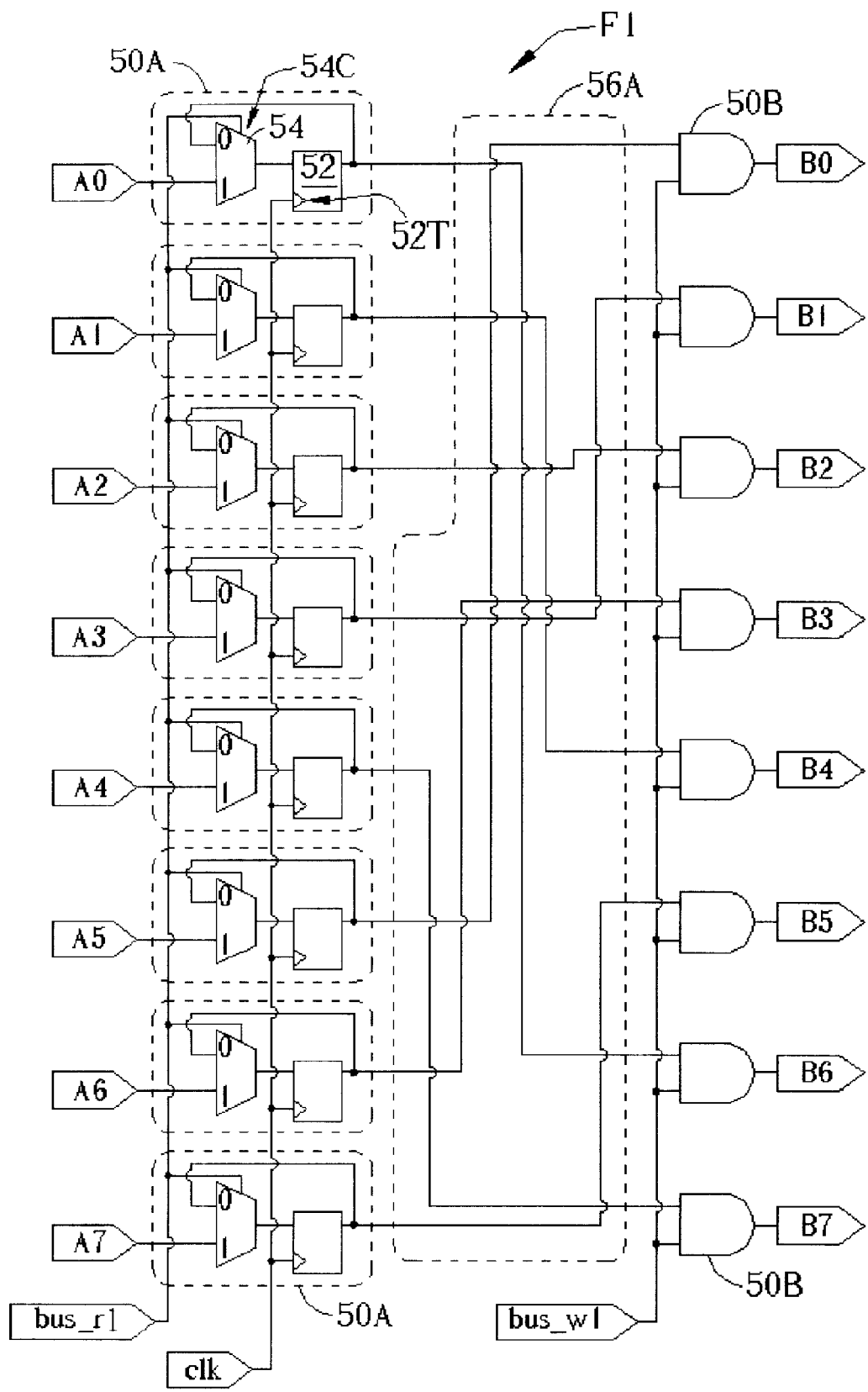
FIG. 5A to FIG. 5D illustrate the various converting circuits for each sub-format in FIG. 4.

Take FIG. 5A, for instance, to elaborate on the basic circuit structures of every sub-format converting circuit. Please refer to FIG. 5A, wherein sub-format converting circuit F1 has in place a plurality of input units 50A, each for receiving one bit of the unconverted data (from A0 to A7); a plurality of output units 50B, each for transmitting one bit of the converted data (from B0 to B7); and a bit control circuit 56A electrically connected between the input units and the output units. Input units 50A contain a multiplexer 54 and a flip-flop 52, of which the multiplexer 54 has an option end 54C and two input ends (separately marked as 0 and 1). One of the input ends is used to receive bit of unconverted data. The option end 54C is controlled by activation signal bus_r1, and output to the multiplexer 54 is connected to the flip-flop 52. The flip-flop 52 contains a clock pulse end 52T, which is under control by clock pulse clk. The bit control circuit 56A is electrically connected to certain input and output units, to directly complete data format conversion. The output units 50B may be implemented by an AND gate; each output unit performs an AND operation on data transmitted by bit control circuit 50C and activation signal bus_w1.

The workings of sub-format converting circuit F1 in FIG. 5A are described as follows: When processor 32A uses bits Cr0 and Cr1 (please refer to FIG. 4) and turns activation signal bus_r1 into "1" through decoder 46A, input units 50A each read one data bit (from A0 to A7 of unconverted data) through respective multiplexer; and through flip-flop clk control simultaneously output each data bit to bit control circuit 56A, which is electrically connected between input units 50A and their corresponding output units 50B, thus directly complete data format conversion. As illustrated in FIG. 5A, an electrically connected bit control circuit 56A is capable of directly achieving bit order change (for instance, making A0 of the unconverted data into B6 of the converted data) in FIG. 2A without calling upon the cumbersome micro-controller instruction set program to do the job.

When processor 32A uses bits Cw0 and Cw1 (please refer to FIG. 4) and turns activation signal bus_w1 into "1" through decoder 46B, sub-format converting circuit F1 uses output units 50B to output each data bit (from B0 to B7) of the converted data. From sub-format converting circuit F1, each bit (from A0 to A7) simultaneously (within the same clk cycle) transmits, in parallel, through bit control circuit 56A to its corresponding output unit, and generates bit data (from B0 to B7) of the converted data. By contrast, the prior art technology, utilizing micro-controller to process data format conversion, consumes many clk cycles to accomplish the same task. For instance, shifting a single bit in buffer would require an entire clk cycle. To accomplish the conversion steps of 1 to 4 by the prior art technology is bound to take up scores of clk cycles.

Figure 1:
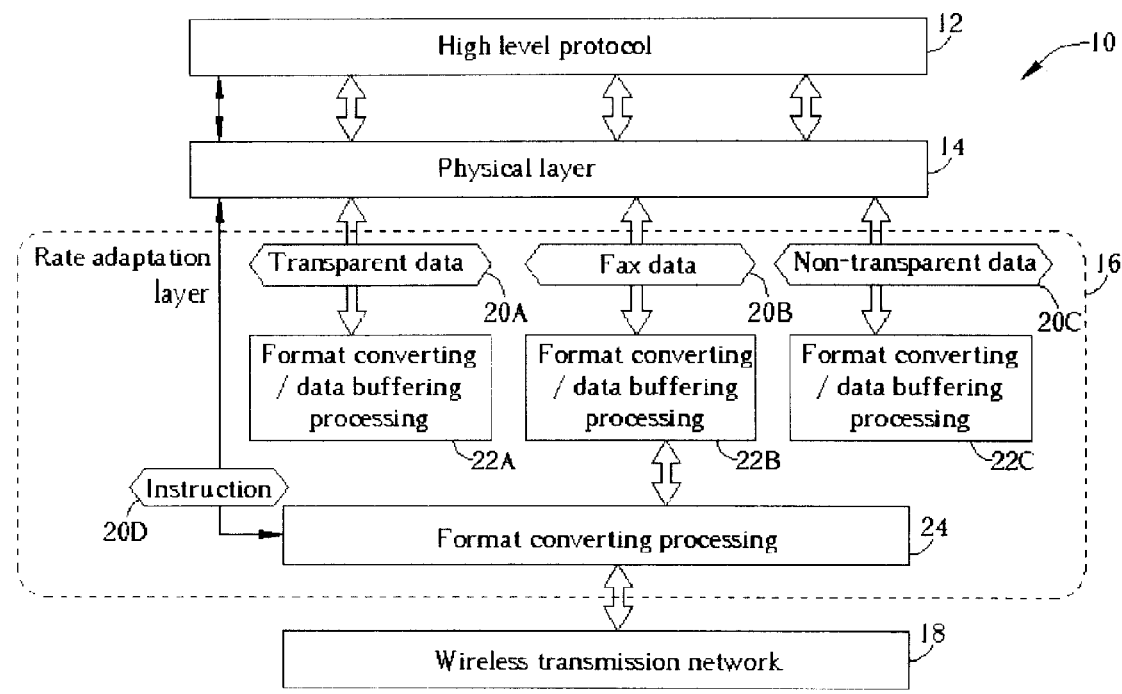
FIG. 1 illustrates a logical lay-out for a typical digital communication system.
Figure 2A:
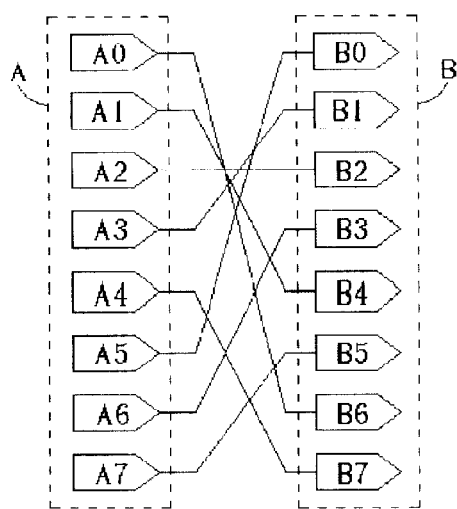
FIG. 2A to FIG. 2D illustrate the data format converting for different data types.
Figure 2B:
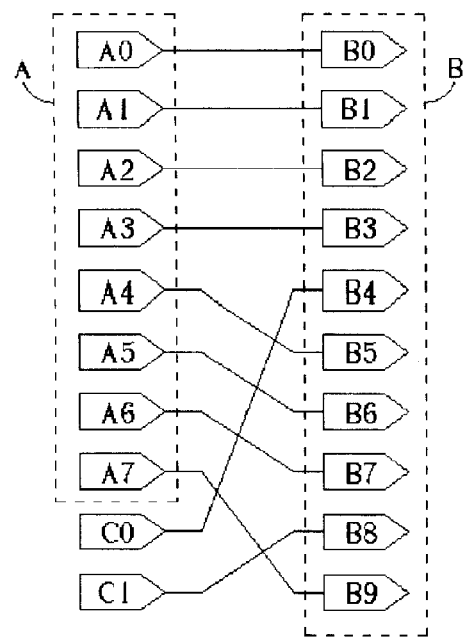
Figure 5B:
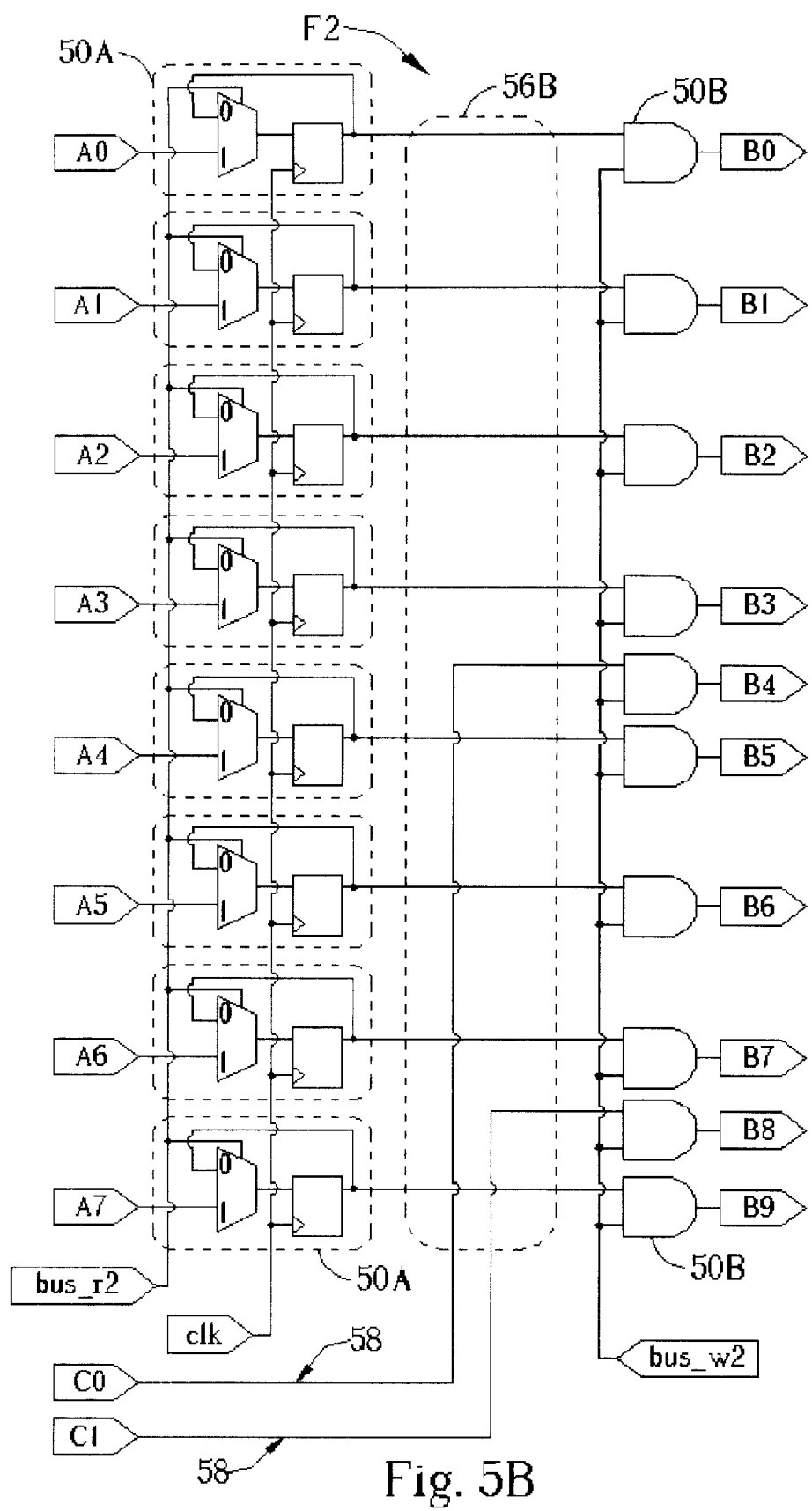

Please refer to FIG. 5B, where a sub-format converting circuit F2 realizes data format converting in FIG. 2B, and insert two control bits, C0 and C1, into converted data.

Sub-format converting circuit F2 contains input units 50A and output units 50B, and they are the same as the ones in FIG. 5B. The activation signals bus_r2, bus_w2, and clk also serve a similar function as their counterparts in F1 of FIG. 5A (which in no way hinders revelation of the present invention), and are thus omitted here.

In FIG. 5B, a bit control circuit 56B joins each output unit to an input unit in accordance with data format converting requirements. The bit transmission circuit 58 is used to transmit control bits C0 and C1 to bits B4 and B8 respectively, and to facilitate their insertion into the converted data. Control bits C0 and C1 are classified as control data 40C of the converting control signal 40, as illustrated in FIG. 4.

Figure 5C:
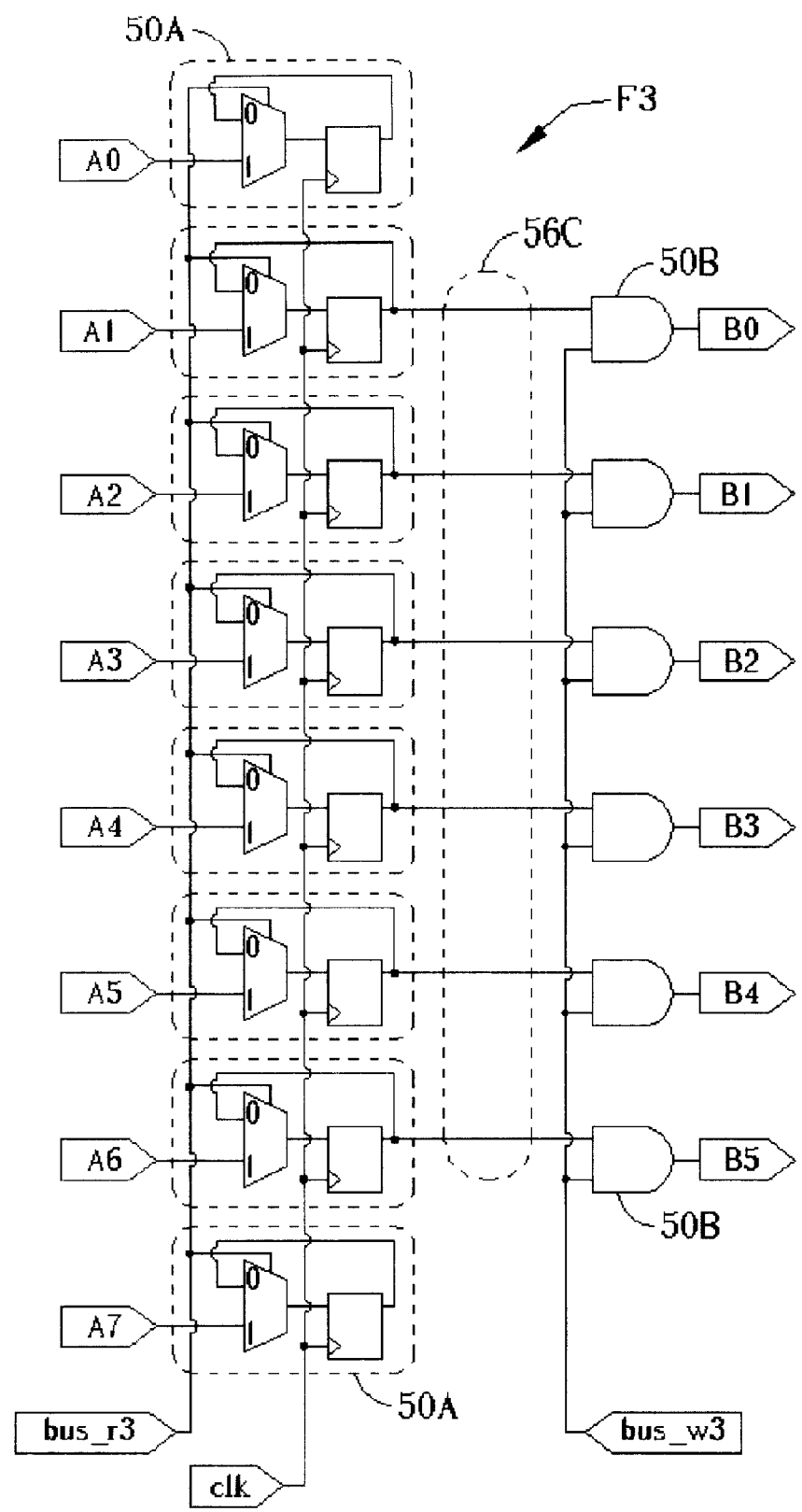
Figure 5D:
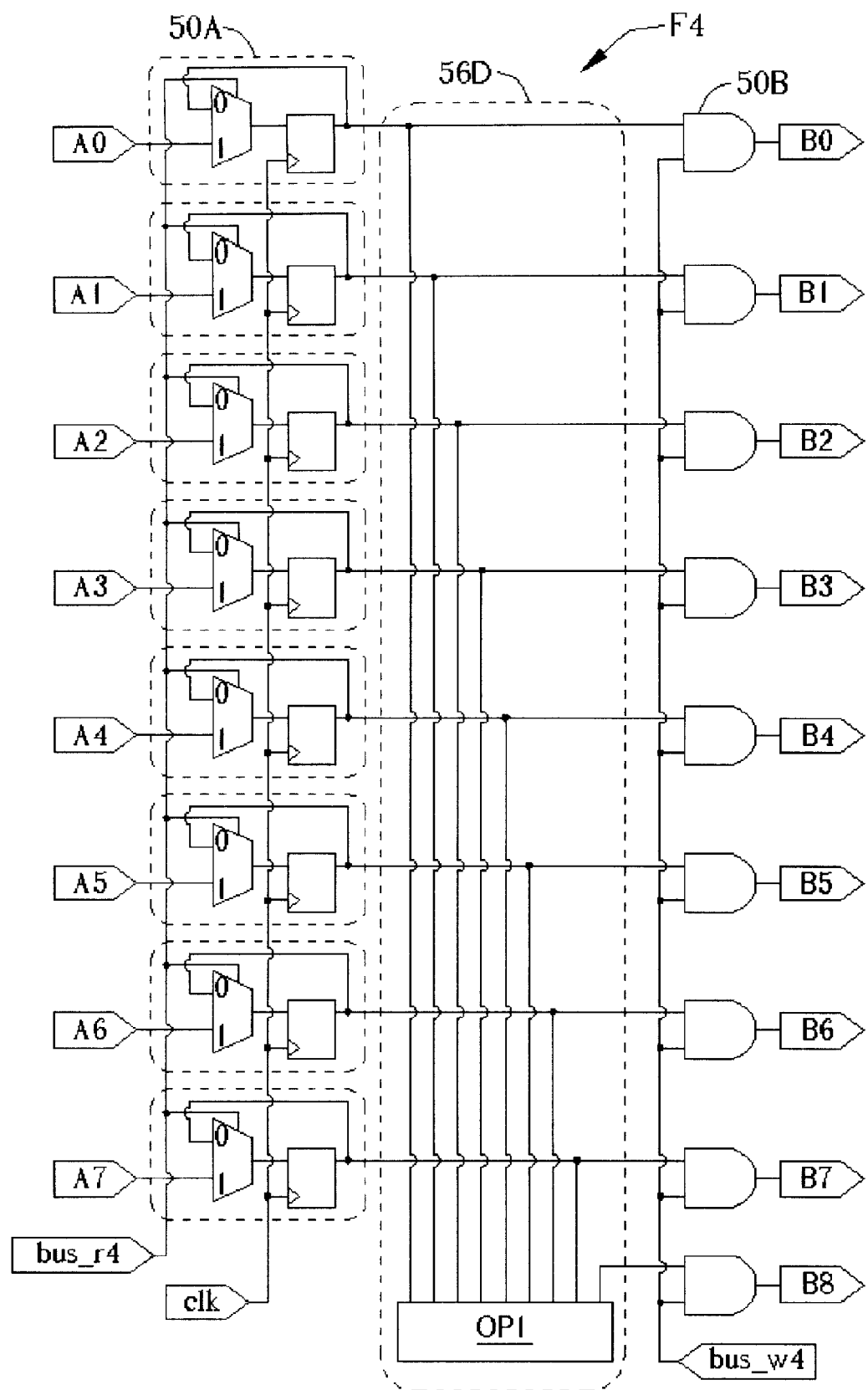

By the same token, sub-format converting circuit F3 in FIG. 5C and F4 in FIG. 5D use input units 50A in conjunction with activation signals bus_r3 and bus_r4 respectively along with clk to receive each bit of the unconverted data, and use the output units 50B to output the data bit by bit in according to the activation signals bus_w3 and bus_w4 respectively. In FIG. 5C, bit control circuit 56C realizes the data format conversion in FIG. 2C; and bit control circuit 56D realizes the data format conversion in FIG. 2D. Bit control circuit 56D includes a logical operation circuit OP1. After the logical operation circuit OP1 receives inputs A0 to A7 from input units, the logical operation circuit OP1 inserts the result of logical operations in the converted data. As illustrated in FIG. 5D, operation circuit OP1 transmits the result to an output bit corresponding to B8, and inserts the result in the converted data. If necessary, other instructions in the control data 40C are also applicable to control the logical operation in OP1 (for instance, different instructions makes operation circuit OP1 perform different logical operations).

Figure 2C:
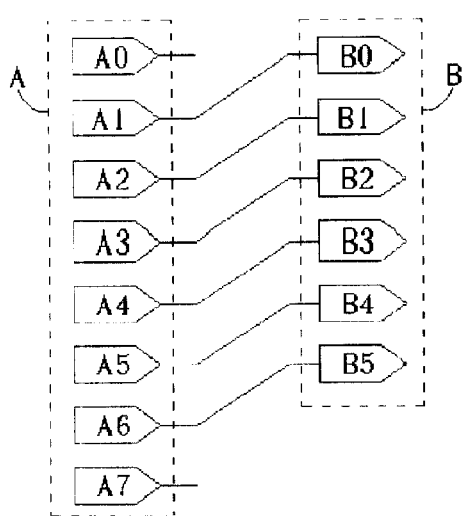
Figure 6:
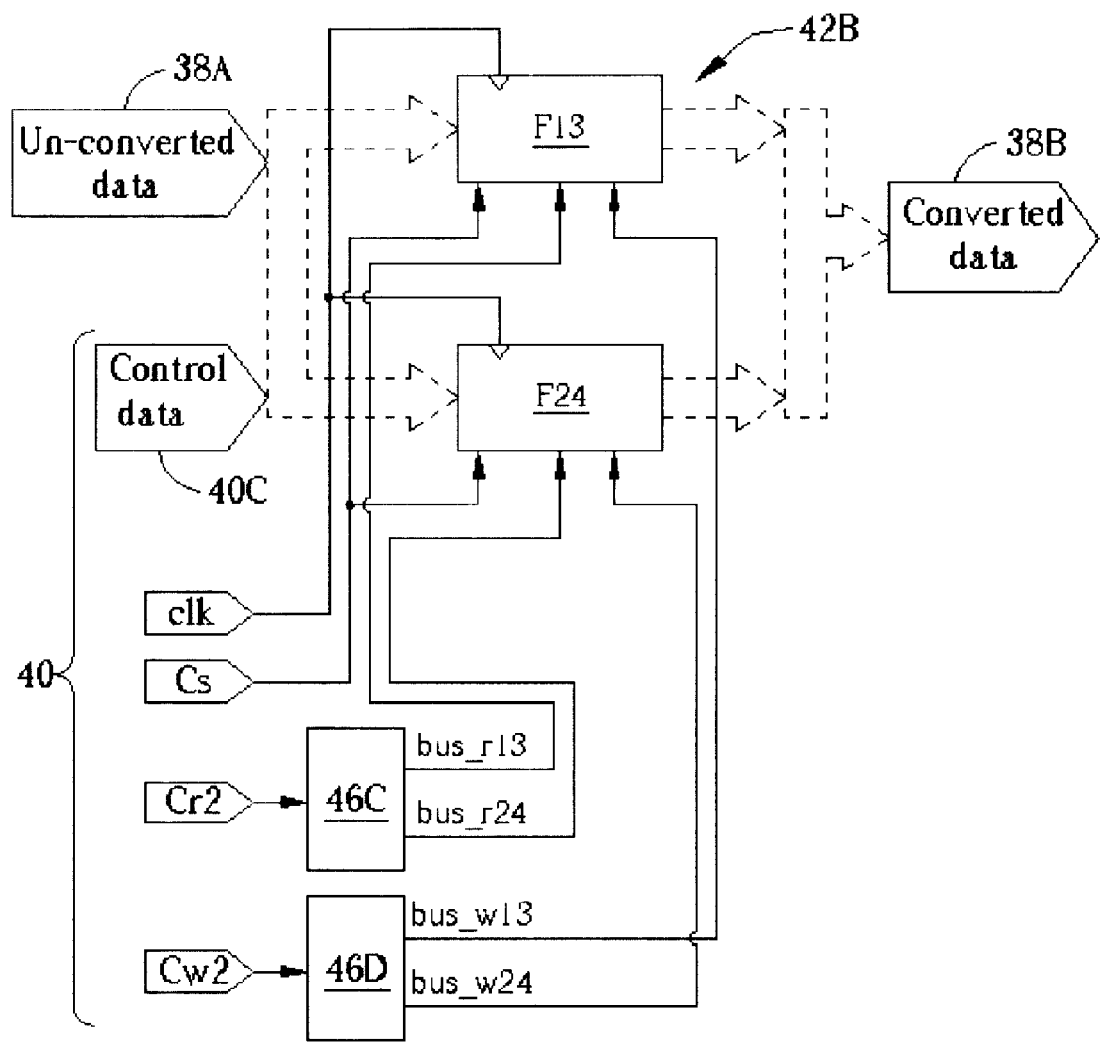
FIG. 6 illustrates another example of the format converting circuit in FIG. 3.

Please refer to FIG. 6, which illustrates a format converting circuit 42B according to another embodiment of the present invention. Format converting circuit 42B involves the installation of two sub-format converting circuits F13 and F24, each capable of executing two types of data conversion. Similar to format converting circuit 42A in FIG. 4, format converting circuit 42B also works with two decoders, 46C and 46D, and generates activation signals bus_r13, bus_r24, bus_w13 and bus_w24 respectively in accordance with bits Cr2 and Cw2 of the converting control signal 40. Clock pulse clk is used to control transmission of data 38A before and after conversion. Sub-format converting circuits F13 and F24 are capable of performing two different types of data conversions, which calls for a Cs bit to control which types of data format converting to perform. In the following discussions, sub-format converting circuits F13 and F24 each perform two types of data format converting, as illustrated in FIG. 2A and FIG. 2C for F13, and in FIG. 2B and FIG. 2D for F24.

The working principle of format converting circuit 42B is detailed as follows: For instance, when processor 32A performs data format converting in FIG. 2D, bits Cr2 and Cw2 of converting control signal 40 are set to "1", which sets activation signals bus_r24, bus_w24 to "1" (other activation signals remain "0"), to control the receiving of unconverted data 38A by sub-format converting circuit F24. Bit Cs being set to "1" prompts sub-format converting circuit F24 to perform data format converting in FIG. 2D. In the end, activation signal bus_w24 controls the output of converted data 38B by sub-format converting circuit F24.

Figure 7A:
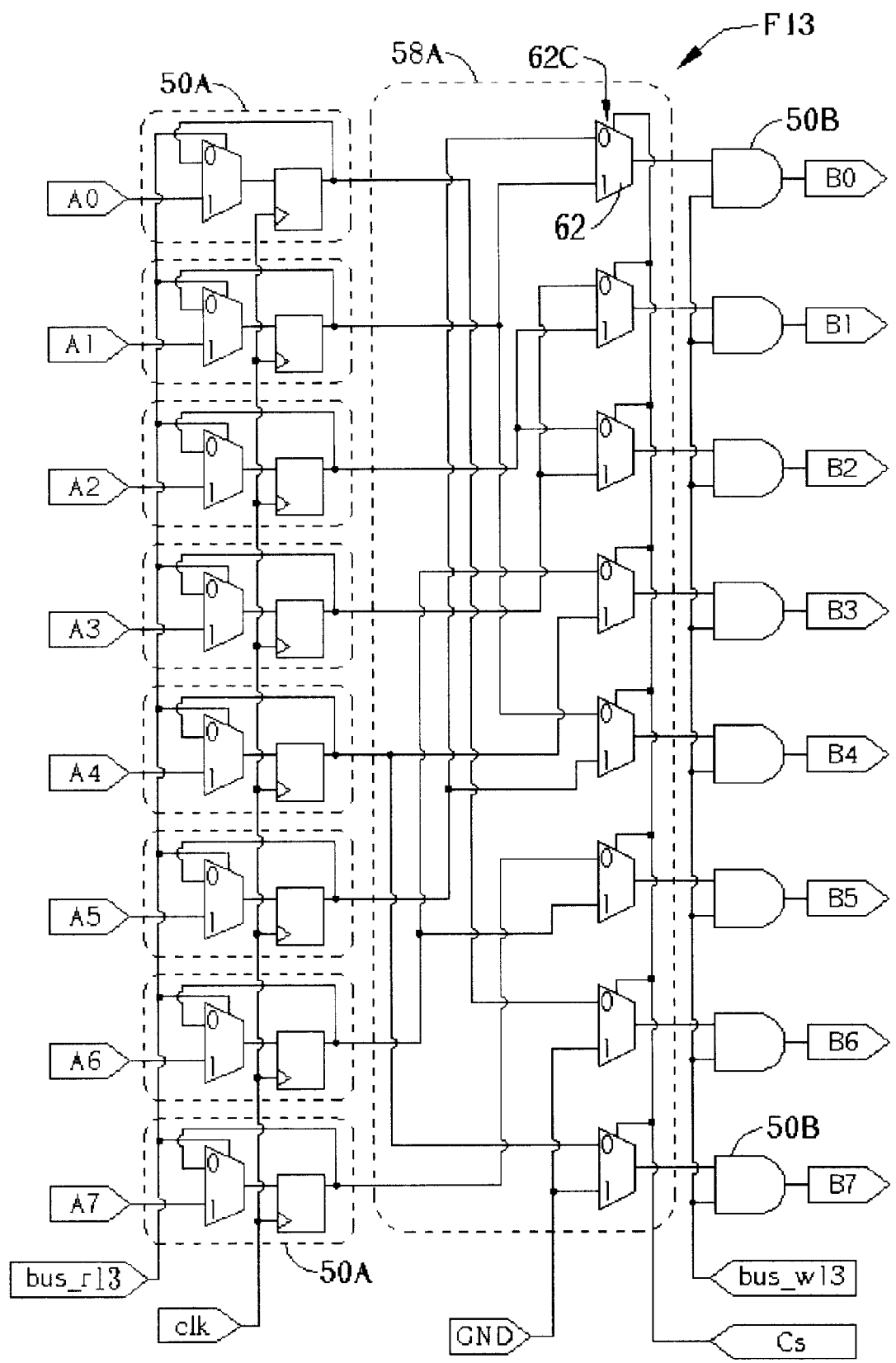
FIGS. 7A and 7B illustrate the various converting circuits for each sub-format in FIG. 6.

Please continue to refer to FIG. 7A and FIG. 8B, which illustrates sub-format converting circuits F13 and F24. Similar to sub-format converting circuits from F1 to F4, F13 also use input units 50A, in conjunction with activation signal bus_r13 and clock pulse clk, to receive each bit (from A0 to A7) of the unconverted data. In this case, the activation signal bus_w13 of the output units 50B transmits out each bit (from B0 to B7) of the converted data, and bit control circuit 58A is responsible for transmitting bits received by each input unit to their corresponding output units. However the difference between F13, F24, and those sub-format converting circuits from F1 to F4 lies in the bit control circuit 58A having a plurality of multiplexers 62 installed. Each multiplexer 62 has two input ends (marked as 0 and 1), one for receiving data from option end 62C which is controlled by bit Cs, and the other connecting to an output end of the output unit. When bit Cs is "0", each multiplexer transmits a bit with input end marked "0" to its corresponding output unit. When Cs is "1", bits corresponding to input ends marked "1" gets transmitted to corresponding output units. With the optional feature of a multiplexer 62, bit control circuit 58A is capable of realizing the functional circuits illustrated in both FIG. 2A and FIG. 2C. For instance, in FIG. 2A B0 bit is equal to A5 bit. Therefore the input end (marked with "0") of multiplexer 62 which corresponds to B0 bits output unit is used to receive the A5 bit. As the logic goes, B7 bit is equal to A4 bit, which uses the input end (marked with "0") of multiplexer 62 which corresponds to B7 bits output unit to receive the A4 bit. In other words, when Cs bit is "0", bit control circuit 58A realizes a data format conversion as illustrated in FIG. 2A. Also, in FIG. 2C when B0 equal to A1 and B5 equal to A6, the output ends (marked with "1") of multiplexer which correspond to the output units of B0 and B5 are respectively used to receive the A1 and A6 bit separately. In FIG. 2C, converted data consists of only B0 to B5 bits, which makes the output ends (marked with "1") of the multiplexer corresponding to B6 and B7 connect to GND, as illustrated in FIG. 7A. As the logic goes, when Cs bit is "1", bit control circuit 58A is capable of realizing the data format conversion in FIG. 2C. In summary, processor 32, using the Cs bit in the converting control signal 40, is capable of controlling the sub-format converting circuit F13, to perform data format conversion in either FIG. 2A or FIG. 2C.

Figure 2D:
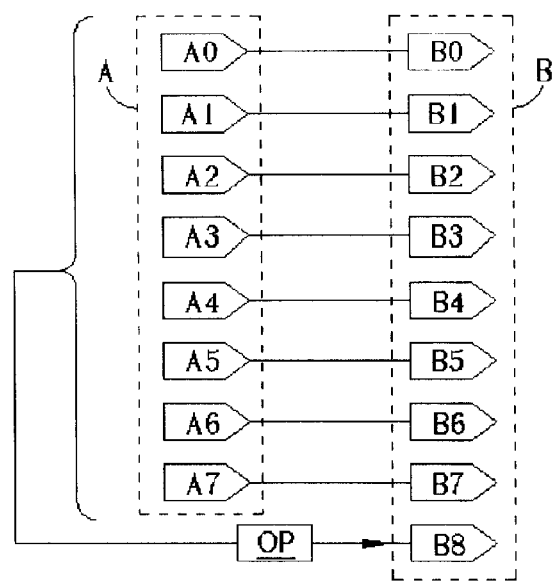
Figure 7B:
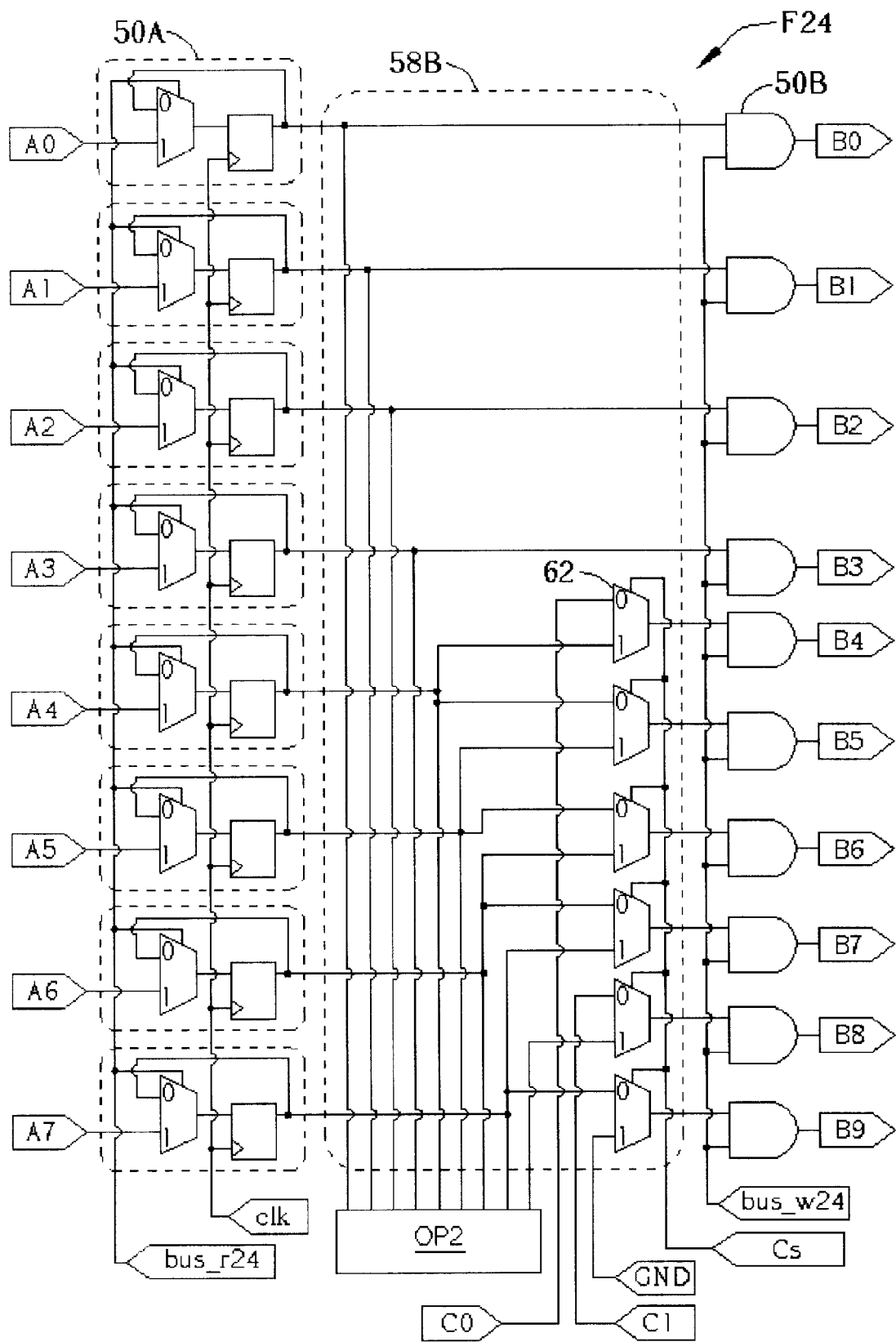

Based on the same principle, the sub-format converting circuit F24 used in FIG. 7B also uses the multiplexer 62 of its bit control circuit 58B, along with the Cs bit, to realize the data format conversion in FIG. 2B and FIG. 2D, where the operation circuit OP2 is used to perform the logical operation OP in FIG. 2D, and C0 and C1 bits are inserted in the converted data in FIG. 2B. When the Cs bit is "0", sub-format converting circuit F24 is capable of performing the data format conversion in FIG. 2B. When the Cs bit is "1", the sub-format converting circuit F24 is capable of performing the data format conversion in FIG. 2D.

As for the inner workings of F24, each input unit works with activation signal bus_r24 and clock pulse clk in receiving unconverted data, and output units 50B work with bus_w24 in transmitting converted data. This is similar in principle to the aforementioned sub-format converting circuits, and is thus omitted here.

Figure 8:
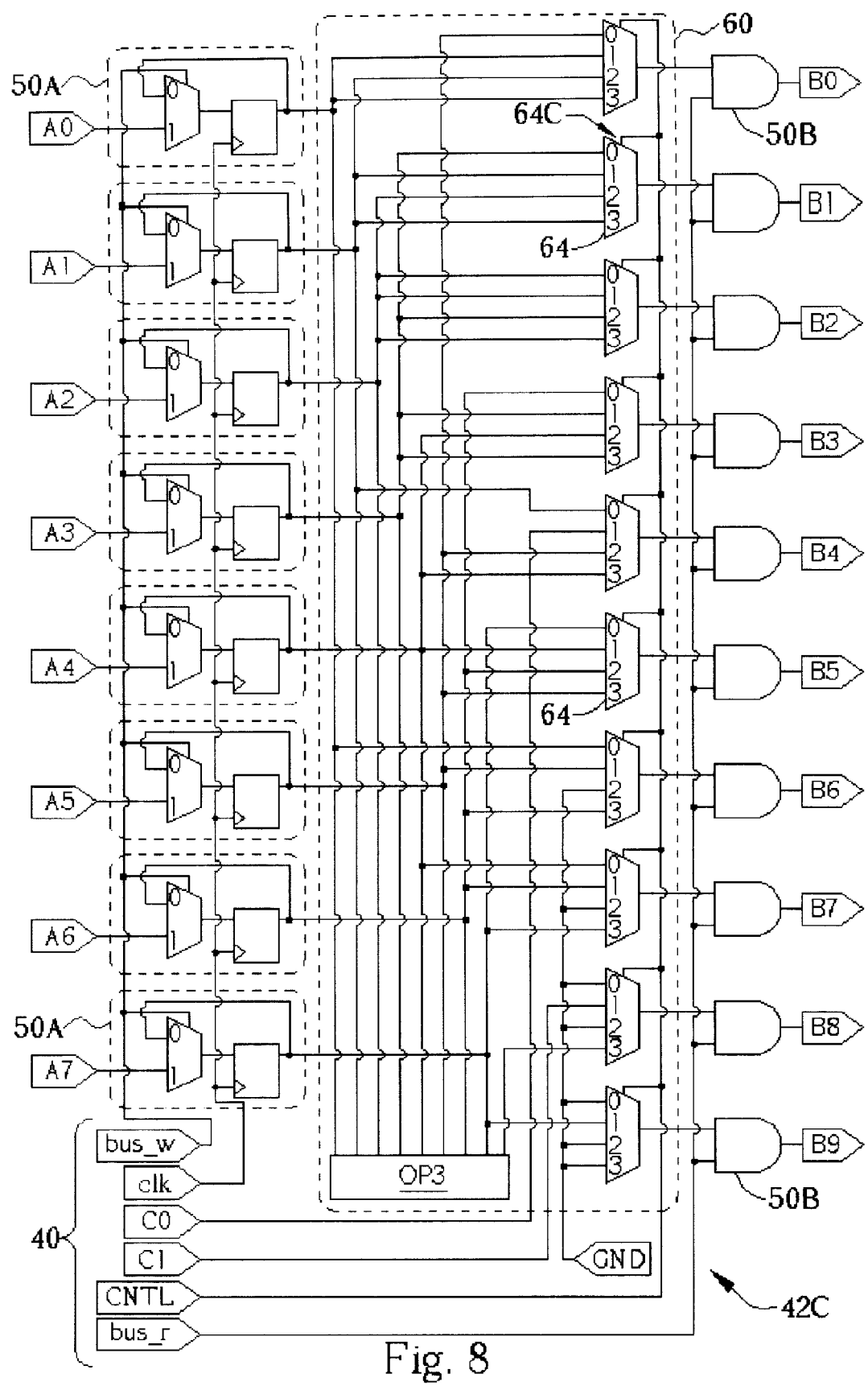
FIG. 8 illustrates another example of the format converting circuit in FIG. 3.

Please refer to FIG. 8, which illustrates a format converting circuit 42C of the present invention. The format converting circuit 42C bit control circuit 60 is used directly to realize the circuitry for four different types of data format conversion:

unconverted data bits, from A0 to A7, are each received by an input unit 50A in accordance with activation signal bus_w and clock pulse clk of the convert control signal 40; and converted data bits, from B0 to B9, are transmitted to each output unit 50B by using the activation signal bus_r of the converting control signal 40.

Similar in configuration to that of sub-format converting circuit in F13 and F24, the bit control circuit 60 also uses the multiplexer 64, to realize the different circuitry required for performing four different types of data format conversion within a bit control circuit 60.

In the bit control circuit 60, each multiplexer 64 corresponds to an output unit and has four input ends installed (separately marked as 0, 1, 2 and 3) for receiving option signal CNTL from option end 64C as well as connecting to an output end corresponding to an output unit.

Option signal CNTL is a two-bit control signal, used to control each multiplexer to select the input bits to be transmitted to the corresponding output unit.

In this way, processor 32A, by merely controlling option signal CNTL, controls what type of data format conversion to perform through the format conversion circuit 42C. For instance, in data format conversions in FIG. 2A, 2B, 2C and 2D, B0 of the converted data is equal to bit A5, A0, A1 and A0 of the unconverted data respectively, which means the input ends (marked as 0, 1, 2 and 3) of the multiplexer that correspond to the B0 bit output unit are to receive bits A5, A0, A1 and A0 accordingly.

As the logic goes, bit B6, in the four different types of data format conversion, from FIG. 2A to FIG. 2D, is equal to A0, A5, no-output, and A6 respectively. This means the input ends (marked as 0, 1, 2 and 3) of the multiplexer 64 that correspond to the A6 bit output unit receive bits A0, A5, GND and A6 accordingly.

The multiplexer 64 outputs the bits received by the input ends (marked as 0, 1, 2 and 3) of the multiplexer 64 to corresponding output units through option signal CNTL, which realizes the data format conversions from FIG. 2A to FIG. 2D respectively.

As for the operation circuit OP3 in bit control circuit 60, it is used to realize the logical operation OP in FIG. 2D. Also, the bit control circuit 60 is also capable of receiving control bits C0 and C1 of the convert control signal 40, in order to realize the data format conversion in FIG. 2B.

With the prior art technology, the micro-controller is called upon to handle data format converting in the rate adaptation layer in accordance with the instruction set program.

The micro-controller instruction set program of the prior art is unable to directly convert data formats, thus requiring cumbersome processes and instructions to complete the data format converting, which takes up more of the micro-controller resources and results in less efficient data processing. Also, a huge memory space is needed to store the instruction set program.

By contrast, the present invention uses a processor to tackle data buffering, and specifically installs a hardware circuit for performing data format conversion. In the above discussions, bit control circuitry in the format conversion circuits 42A, 42B or 42C is capable of directly realizing various types of data format conversions, as well as performing simultaneous processing on each bit of the unconverted data. This allows each converted bit to be generated during the same clock pulse cycle, markedly improving efficiency in data format conversion without taking up processor resources and storing software programs needed for data format conversion. As related data indicates, the format conversion circuit of the present invention is capable of reducing, by up to 90%, the time required for data format conversion, a solid proof of the strength of the present invention over the prior art technology. Please notice that FIG. 2A to FIG. 2D are used as examples for the four different types of data format conversion, and format conversion circuits 42A to 42C are also used to realize data format conversions in FIG. 2A to FIG. 2D. However, the spirit of the present invention, is readily applicable to various types of data format conversion, which is in no way limited to examples in FIG. 2A to FIG. 2D.

The aforementioned is a basic example of this very invention, any even adaptation and modification to the patent that is based on the present invention should fall within the realm of legal protection granted to this patent.

What is claimed is:

1. A transmission circuit that receives input data at a first rate and outputs data at a second rate, the transmission circuit comprising:

a processor for controlling operations of the transmission circuit, the processor for accepting input data and generating corresponding first data having a plurality of bits; and a format converting circuit electrically connected to the processor for generating second data having a plurality of bits according to the first data, the format converting circuit comprising:

a plurality of input units each for receiving one bit of the first data;

a plurality of output units each for outputting one bit of the second data after receiving the bit; and a bit control circuit electrically connected between the input units and the output units for generating bits outputted by the output units according to bits received from the input units;

the bit control circuit transmitting a bit received by an input unit to an output unit without having the bit passing through other input and output units, a number of bits between the bit received by the input unit and a most significant bit of the first data being different from a number of bits between the bit outputted by the output unit and a most significant bit of the second data;

wherein the processor further controls the transmission circuit to output data sequentially according to the second data, and the bit control circuit further comprises an operating circuit electrically connected between the input units and the output units for performing a logical operation according to a predetermined law on the bits received by the input units to generate the bits transmitted by the output units.

2. The transmission circuit of claim 1 wherein the processor is for buffering the first or second data so that the processor outputs data at a second rate according to the second data.

3. The transmission circuit of claim 1 wherein the bit control circuit further comprises a bit transmission circuit for transmitting a bit of predetermined data to an output unit.

4. The transmission circuit of claim 1 wherein the bit control circuit is for transmitting two bits received from two different input units to two different output units separately.

5. The transmission circuit of claim 1 further comprising a bus connected between the processor and the format converting circuit for transmitting the data between the processor and the format converting circuit.

6. The transmission circuit of claim 1, wherein the transmission circuit is used for realizing a rate adaptation layer of a digital communication system.

* * * * *